April 13, 1926.

R. V. HUTCHINSON 1,580,201

BRAKE OPERATING MEANS

Filed March 30, 1923    2 Sheets-Sheet 2

Patented Apr. 13, 1926.

1,580,201

UNITED STATES PATENT OFFICE.

ROLAND V. HUTCHINSON, OF DAYTON, OHIO, ASSIGNOR TO GENERAL MOTORS RESEARCH CORPORATION, OF DAYTON, OHIO, A CORPORATION OF DELAWARE.

BRAKE-OPERATING MEANS.

Application filed March 30, 1923. Serial No. 628,913.

*To all whom it may concern:*

Be it known that I, ROLAND V. HUTCHINSON, a subject of the King of Great Britain, residing at Dayton, county of Montgomery, and State of Ohio, have invented certain new and useful Improvements in Brake-Operating Means, of which the following is a full, clear, and exact description.

This invention relates to improvements in brake operating mechanism for motor vehicles.

It is among the objects of the present invention to provide controlling means of simple structure and design wherein certain elements of the power plant are utilized thus facilitating the application of this brake controlling means in a limited space.

Further objects and advantages of the present invention will be apparent from the following description, reference being had to the accompanying drawings wherein a preferred form of the embodiment of the invention is clearly shown.

Figure 1:
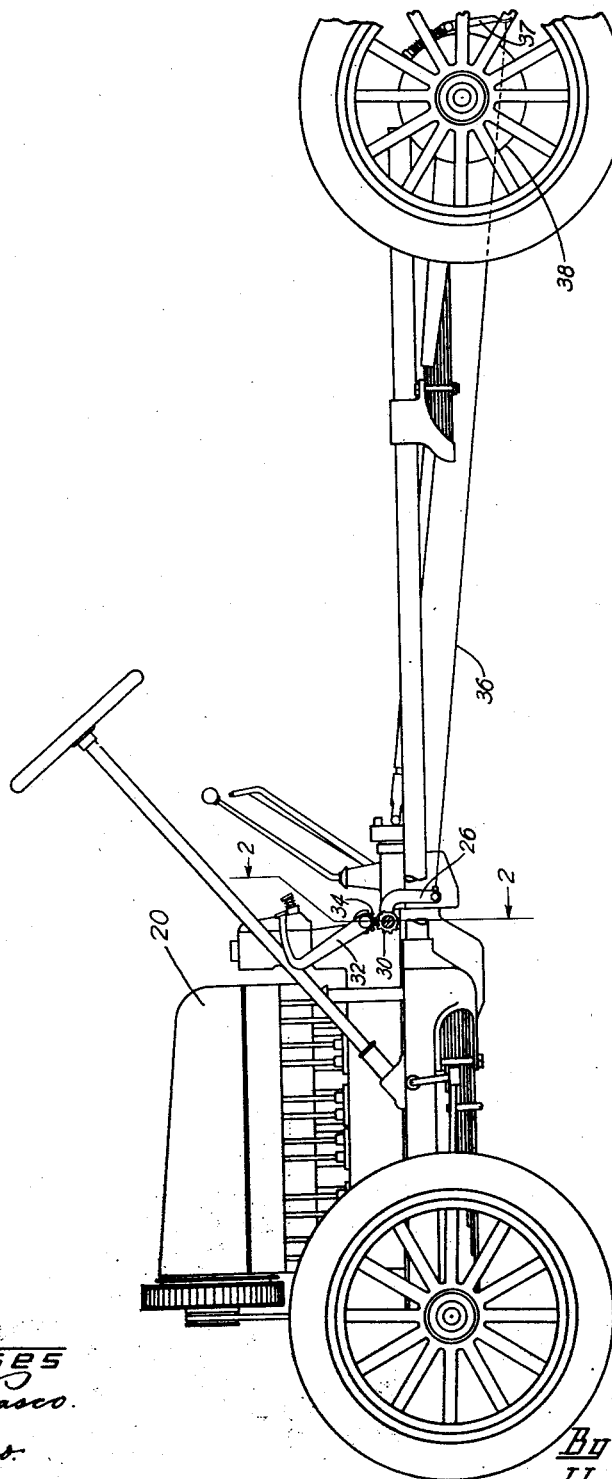
Fig. 1 shows a chassis of an automobile with the improved brake controlling device installed thereon.

Referring to the drawings, the numeral 20 designates a power plant having the usual housing 21 which includes the flywheel clutch and clutch operating mechanism. The clutch operating mechanism includes a clutch releasing yoke 22 which is carried by and secured to the clutch shaft 23. This clutch shaft 23 is journalled in bushings 24 and 25 which in turn are carried by the housing 21. Both these bearings 24 and 25 project beyond the sides of the housing 21 forming bearings for the levers 26 and 27 respectively.

The lever 26 includes a collar portion 28 which rotatably fits on the bushing 24 while the lever 27 includes a collar portion 29 which rotatively fits on the bushings 25. Both these collars 28 and 29 are provided with a plurality of teeth 30 formed on their periphery. At the one end of the shaft 23 there is secured a pedal 241 which is termed the clutch pedal and which when operated will rotate the clutch yoke 22 to release the clutch. Interposed between the collar 28 and pedal 241 and mounted on the shaft 23 is a spacing collar 23ª which tends to hold the collar 28 in alignment with the collar 33. The collar 29 is held in aligned position with the collar 35 by means of a spring 351 interposed between said collar 29 and a washer 36 secured to the shaft 23.

Journalled in the housing 21 and as shown in the drawing, located above the shaft 23 is another shaft 31 having its ends projecting beyond the sides of the said housing. Mounted on and secured to the shaft 31 and adjacent to the lever collar 28 is a collar 33 having a plurality of teeth 34 formed on a portion of its periphery, said teeth engaging with the teeth 30 formed on the periphery of the collar 28 of lever 26. Likewise there is provided a collar 35 secured to the shaft 31 adjacent to the collar 29 and having peripherial teeth with which engage and cooperate with gear teeth formed on the periphery of the collar 29 of lever 27. Carried by and secured to the outer end of the shaft 31, adjacent to the collar 33 is a pedal 32 which is termed the brake pedal.

Figure 3:
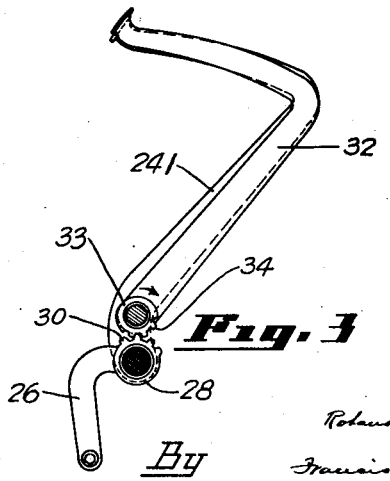
Fig. 3 is a detail side view of the brake controlling mechanism taken along lines 3—3 of Fig. 1.

From the foregoing it may be seen that when the pedal 32 is depressed, the shaft 31 will be rotated in a direction of the arrow as shown on the drawing in Fig. 3, thus rotating the collars 33 and 35 secured to said shaft.

These collars 33 and 35 being in engagement with the collars 28 and 29 respectively by means of the teeth 30 and 34, will tend to rotate said collars 28 and 29 in an opposite direction on the bushings 24 and 25 respectively.

As is shown on Fig. 1, the levers 26 and 27 are connected with their respective brake operating levers 37 by means of rods or cables 36, thus, when the brake pedal 32 is depressed, the resultant motion on the levers 26 and 27 will tend to create a pull on the rods or cables 36 and levers 37, thus tending to operate the brakes 38 to retard the motion of the wheels with which they are associated.

Figure 2:
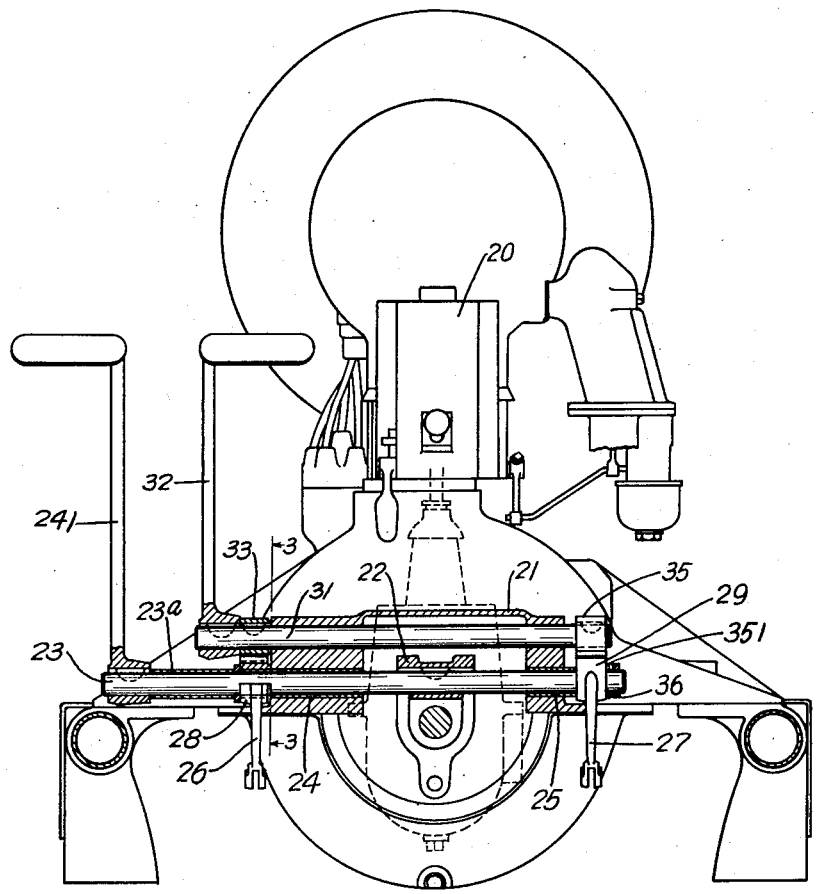
Fig. 2 is a part sectional view taken along the line 2—2 of Fig. 1.

As is shown on Fig. 2, two rods lead from the brake operating mechanism and it may be clearly understood that each of these rods may go to its separate and distinct brake device, or both said rods may be connected to an equalizing lever which in turn is connected with both brakes.

In the case where each lever 26 and 27 is connected with its respective brake, each brake would be separately adjusted, however, if an equalizer rod were used, this rod would tend to compensate for any variation in the adjustment of the two brakes, thus tending to overcome a more intense gripping of one brake than the other.

From the foregoing it may also be seen that by the use of a brake operating mechanism of this type, the rods or cables connecting the same with the brakes may be hung comparatively low thereby substantially eliminating the interference of said rods with the floorboards or other elements of the motor vehicle associated with the transmission device of the vehicle.

While the form of embodiment of the invention as herein described, constitutes a preferred form, it is to be understood that other forms might be adopted all coming within the scope of the claims which follow.

What I claim is as follows:

1. In a motor driven vehicle and in combination with a unitary driving motor comprising an engine and a housing for parts of the driving mechanism, and with brake mechanism for the rear wheels of the vehicle; an oscillating clutch supporting shaft supported by said housing; two oscillating brake applying levers supported by said housing in positions concentric to said clutch operating shaft, and which levers are operatively connected with said brake mechanism; an oscillating brake applying shaft arranged above and parallel with said clutch shaft, and supported also by said housing; means whereby said levers are operated from and by said brake applying shaft; and means for operating said two shafts.

2. In a motor driven vehicle and in combination with a unitary driving motor comprising an engine and a housing for parts of the driving mechanism, and with brake mechanism for the rear wheels of the vehicle; an oscillating clutch supporting shaft supported by said housing; two oscillating brake applying levers supported by said housing in positions concentric to said clutch operating shaft, and which levers are operatively connected with said brake mechanism; an oscillating brake applying shaft arranged above and parallel with said clutch shaft, and supported also by said housing; interengaging toothed members carried by said levers and by said brake applying shaft, and through which movement of said shaft is communicated to said levers; and means for operating said two shafts.

In testimony whereof I hereto affix my signature.

ROLAND V. HUTCHINSON.